United States Patent [19]

Gallas

[11] Patent Number: 4,513,492

[45] Date of Patent: Apr. 30, 1985

[54] APPARATUS FOR FORMING CABLE ENTRY PORT

[75] Inventor: Gunter A. Gallas, New Hyde Park, N.Y.

[73] Assignee: Slater Electric, Inc., Glen Cove, N.Y.

[21] Appl. No.: 479,550

[22] Filed: Mar. 28, 1983

Related U.S. Application Data

[62] Division of Ser. No. 200,422, Oct. 24, 1980.

[51] Int. Cl.[3] .............................................. B23P 23/00

[52] U.S. Cl. .................................. 29/564.7; 29/33 R; 83/54

[58] Field of Search ................. 29/33 R, 564.1, 564.2, 29/564.7, 566.1, 566, 564; 225/97, 103; 83/54

[56] References Cited

U.S. PATENT DOCUMENTS

| | | | |
|---|---|---|---|
| 3,271,988 | 9/1966 | Klinksiek | 83/54 |
| 3,557,649 | 1/1971 | Kirchner | 83/54 |
| 3,863,531 | 2/1975 | Forschner et al. | 83/54 |
| 3,971,275 | 7/1976 | Mach | 83/54 X |
| 4,060,366 | 11/1977 | Johansson | 83/54 X |

*Primary Examiner*—William R. Briggs
*Attorney, Agent, or Firm*—Morgan, Finnegan, Pine, Foley & Lee

[57] ABSTRACT

Apparatus for completing the fabrication of molded electrical junction boxes includes a set of rams for perforating webs remaining in the cable entry ports after the molding process. The rams have cutting edges and are driven along guide rails into the entry ports. A spring loaded plate having teeth or pins contacts the box for aligning the box with the rams.

6 Claims, 14 Drawing Figures

APPARATUS FOR FORMING CABLE ENTRY PORT

This is a division of application Ser. No. 200,422 filed Oct. 24, 1980.

BACKGROUND OF THE INVENTION

The present invention relates generally to the fabrication of plastic electrical outlet boxes and, more particularly, to a method and apparatus for forming the closure members of cable entry ports in such boxes to permit relatively easy entry of an electrical cable into the box through the ports.

Outlet boxes are widely used in the construction industry for connecting electrical cables in the walls of a building to the desired wiring devices—i.e., receptacles and switches—by which access is provided to electrical power. While outlet boxes have been fabricated from metals, such as steel or aluminum, for physical strength, boxes fabricated from a moldable thermo-plastic material have been receiving increasing commercial acceptance. The plastic boxes are advantageous in their ease of manufacture (being moldable in a simple two-part injection mold) as well as their light weight.

Virtually all boxes, including the plastic boxes, have cable entry ports formed in the box walls to admit an electrical cable into the box. Various structures have been designed for keeping the ports closed prior to use, yet permitting admission of an electrical cable when desired. One recent design, incorporated in boxes sold by Slater Electric Inc. of Glen Cove, N.Y. (the assignee of the present application), includes panel members at the rim of the cable entry port, joined together by a webbing or like structure to close the port. This port closure means is adapted to withstand prescribed forces under various conditions yet permits opening when desired by forcing the end of the cable against the web.

Although the webs can be molded to a precise thickness to satisfy industry standards, some difficulty may be experienced in the flow of material in the area of the cable-entry ports during the molding operation. Too little material, of course, raises the danger of failing the industry strength tests. However, by increasing the thickness of the webbing, the ports may not be easily opened by forcing the cable end against the web.

Accordingly, it is an object of the present invention to provide new and improved method and apparatus for forming cable entry port closure means in molded plastic electrical outlet boxes, which provides closure of each cable entry port sufficient to withstand all industry tests, yet capable of being opened by forcing the end of a cable against the closure means.

SUMMARY OF THE INVENTION

Briefly described, the present invention includes a method and apparatus for pre-fracturing a web-like portion in the closure member of a cable entry port in a molded plastic outlet box. A ram apparatus constructed in accordance with the invention is adapted to hold the outlet box while advancing a preformed cutting edge towards the web-like portion in order to fracture the web regardless of the thickness of the web or closure member, thereby facilitating the entry of a cable into the port. The apparatus advantageously includes a guide upon which the ram slides, locating means for maintaining the desired position for the box prior to and during the fracture operation, and adjustment means for presetting the amount of penetration of the cutting edge into the port. The apparatus may be constructed with one, two, or more pairs of oppositely disposed ram members, in parallel arrangement along the guide for simultaneously fracturing the webs of a plurality of ports formed in the same wall of an outlet box.

It will be understood that the present invention, as described and embodied herein, achieves the principal objects and advantages described herein. The invention resides in the novel parts, structures, steps and methods described herein. Accordingly, the accompanying drawings, which form a part hereof, illustrate preferred embodiments of the invention.

BRIEF DESCRIPTION OF THE DRAWINGS

The foregoing aspects and other features of the invention are explained in the following description taken in connection with the accompanying drawings wherein.

DETAILED DESCRIPTION OF PREFERRED EMBODIMENT

Figure 1:
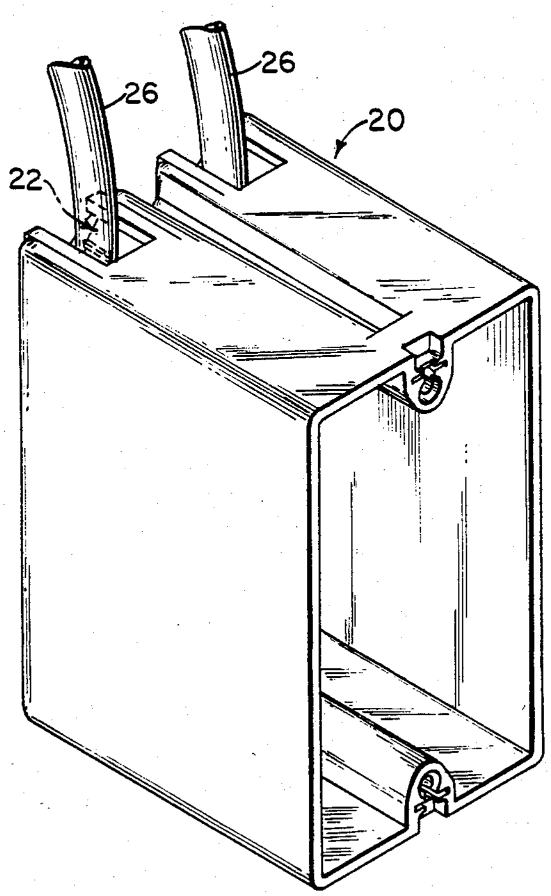
FIG. 1 is an isometric view of a molded plastic, single-gang, electrical outlet box, showing electrical cables entering the box through the cable entry ports.
Figure 2:
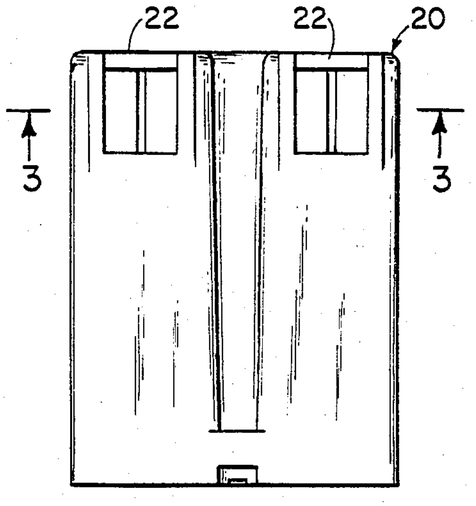
FIG. 2 is an end view of the box of FIG. 1 showing cable entry ports with webs connecting the closure panels prior to implimentation of the present invention.
Figure 3:
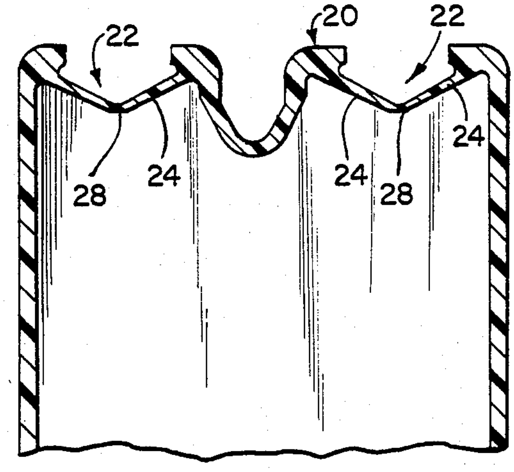
FIG. 3 is a sectional view taken along the line 3—3 in FIG. 2.

Referring now to FIGS. 1-4, a single-gang molded plastic electrical outlet box 20 is shown, formed with a pair of cable entry ports 22 in opposite end walls of the box. The box 20 and the ports 22 are formed integrally in a mold (not shown) of a generally rigid thermo-plastic material which is somewhat resilient to permit flexing of the closure panels 24 upon entry of an electric cable 26, as explained in greater detail in co-pending applications Ser. Nos. 879,767 (filed Feb. 21, 1978) and 22,993 (filed Mar. 22, 1979), both assigned to the same assignee of the present application, the disclosures of which are hereby incorporated by reference herein. Suitable plastic materials include the polyethylene, polystyrene, polycarbonate and ABS plastic materials described in said co-pending applications. For clarity of illustration, the boxes herein are shown without mounting means for mounting to a stud, wall, etc.

As here shown, panels 24 of box 20 depend angularly towards each other from the rim around each port 22 for flexing about the edges of the port 22. The panels 22 are joined by thin webs 28 (FIG. 3) in the molding process, generally along the centerline of the port 22. The webs 28, together with panels 22, close the ports 22 to prevent the entry of debris into the box.

Figure 4:
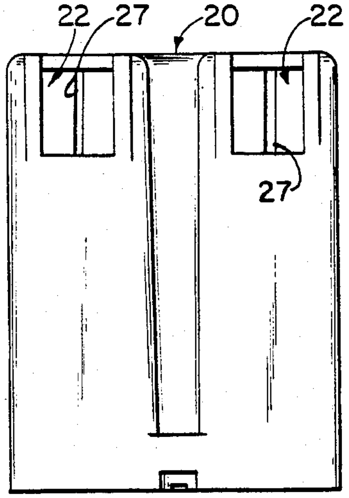
FIG. 4 is an end view of the box of FIG. 1 showing the cable entry ports after web-fracturing according to the invention.
Figure 5:
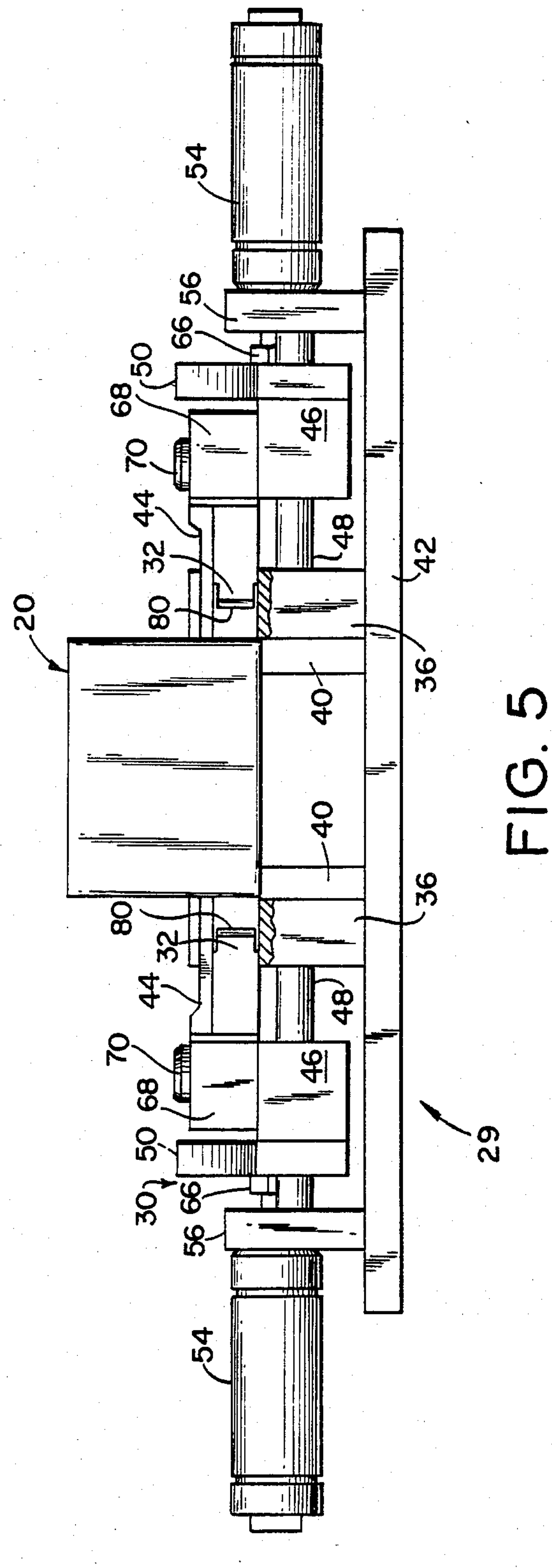
FIG. 5 is an elevation view of apparatus according to the invention, showing simultaneous pre-fracturing of webs on opposite end walls of a single-gang outlet box.

In accordance with the invention, each web 28 preferably is perforated or pre-fractured after the box is molded by a cutting edge of a ram which advances into the port and strikes the webbing. Upon pre-fracture of the web 28, as shown in FIG. 4, a hairline fracture (27) separates each pair of panels 24 which can thereafter be spread apart by the force of electrical cable 26 against fractured web 28 to admit the cable into box 20 via port 22.

Referring now to FIGS. 5–8, there is shown an assembly 29 which includes two pairs of oppositely disposed ram-like apparatuses for carrying out the invention. Each pair of ram apparatuses are positioned for location adjacent opposite end walls of box 20 and each apparatus 30 incorporates a set of rams 32 for perforating the webbing 28 in each port 22 of box 20. Assembly 29 also includes uprights 36 and blocks 40 both of which are supported by a base 42 to help position the box 20 relative to the rams 32. Blocks 40 can be part of a guide-rail system in an assembly line for completing assembly of the box.

Each apparatus 30 includes a locator plate 44 having teeth 45 for engaging a corner of the box 20 to align the ports thereof with their corresponding rams 32. The rams 32 and the locator plate 44 are carried by a slide 46 along rails 48 which are supported by uprights 36 and additional uprights 56. The slide 46 includes a rear block 50 which is mechanically coupled to the piston 52 of a compressed-air drive unit 54. The rails 48, supported by uprights 36 and 56, orient the locator plate 44 towards the box 20 and direct the rams 32 into the ports 22 as the slide 46 is urged towards the box 20 by the drive unit 54.

Compressed air for operating the drive unit 54 is coupled thereto by conduits (shown schematically at 58) from a valve assembly 60 operatively coupled to a source 62 of compressed air.

Figure 8:
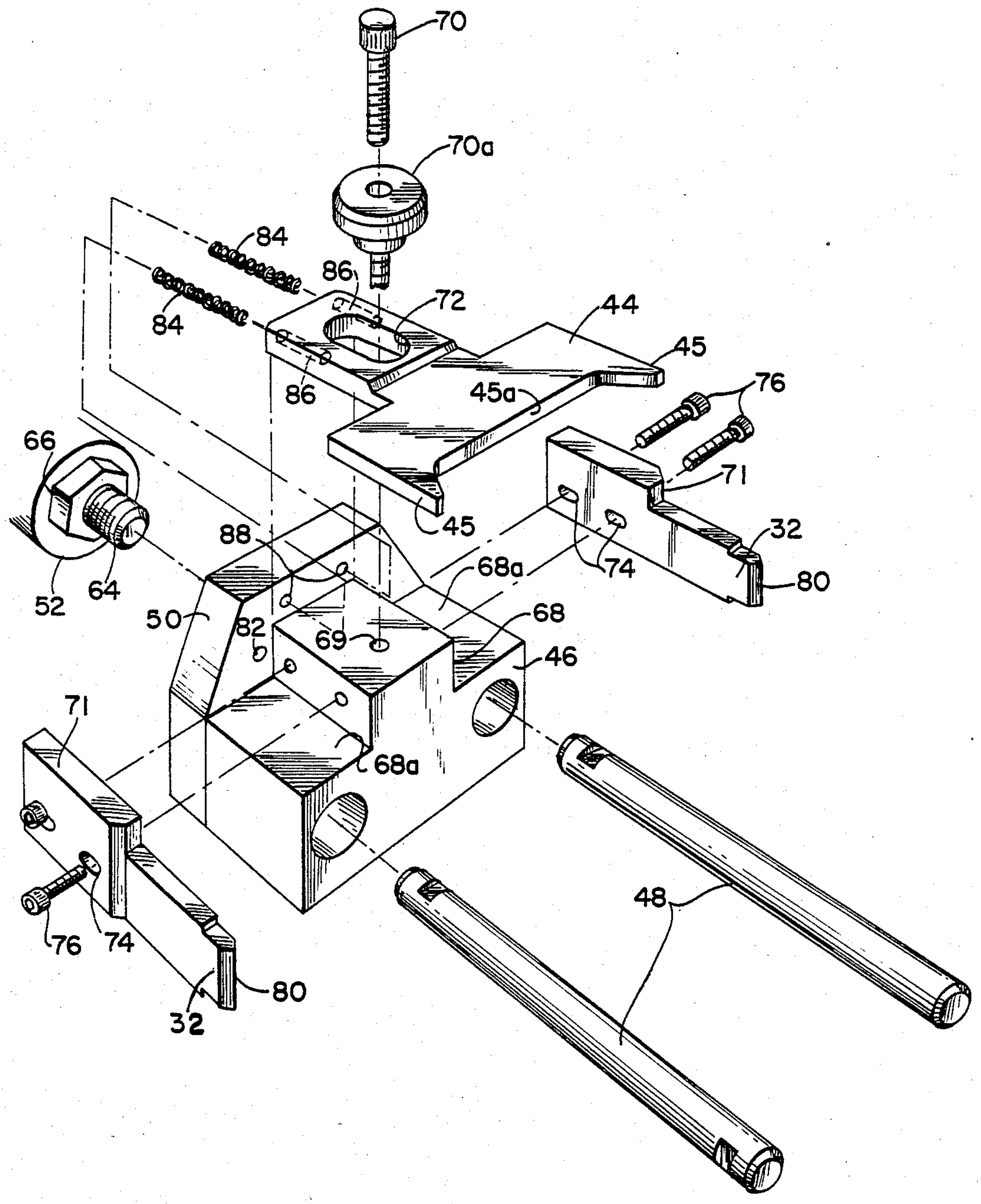
FIG. 8 is an exploded view of a portion of the apparatus of FIG. 6.

As best seen in FIG. 8, the mechanical coupling of the piston shaft 52 to the block 50 is accomplished by a threaded end 64 which is secured to the block 50 by tightening a nut 66 threaded against the block 50. The slide 46 includes an upstanding, centrally located shoe 68 which forms a pair seats 68*a*. The locator plate 44 is adjustably secured to the slide 46 by means of a knurled screw 70 and washer 70*a* which are mounted on top of the shoe 68, in threaded hole 69, and passes through a longitudinal slot 72 in the plate 44. The head of the washer 70*a* lightly contacts the plate 44 so that the plate 44 can slide into the slot 72 to permit movement of the slide 46 and the rams 32 even after the plate 44 has contacted the box 20.

Figure 6:
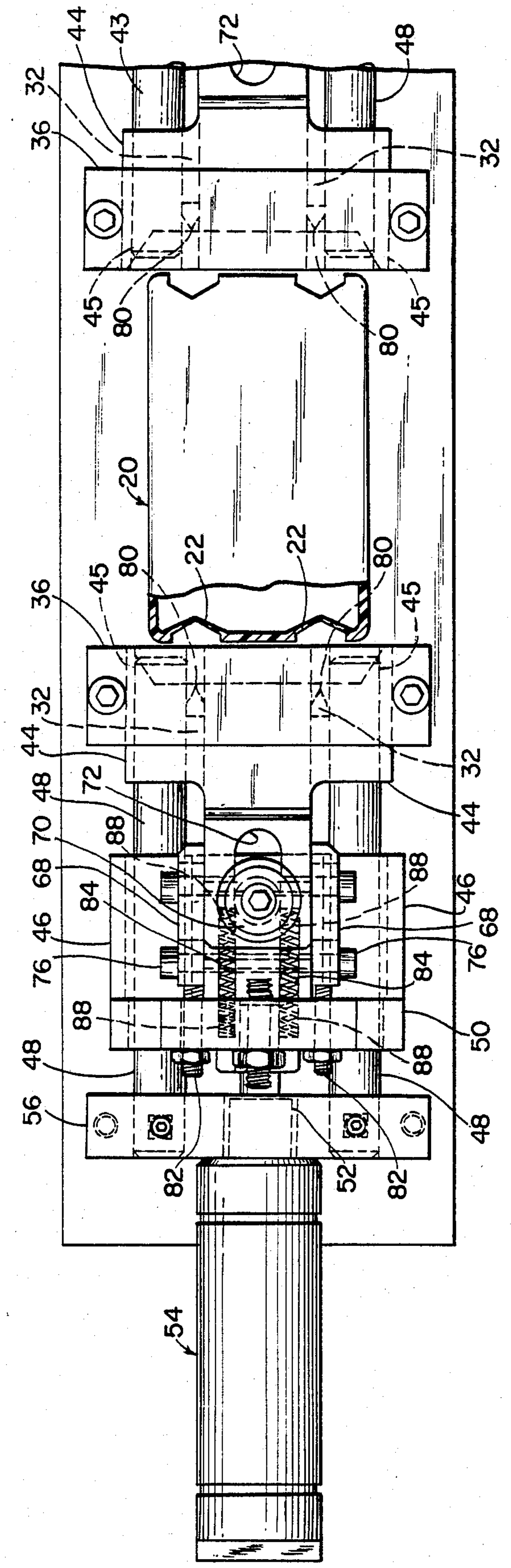
FIG. 6 is a detailed plan view of one side of the apparatus of FIG. 5 shown with the outlet box prior to the fracture step.
Figure 7:
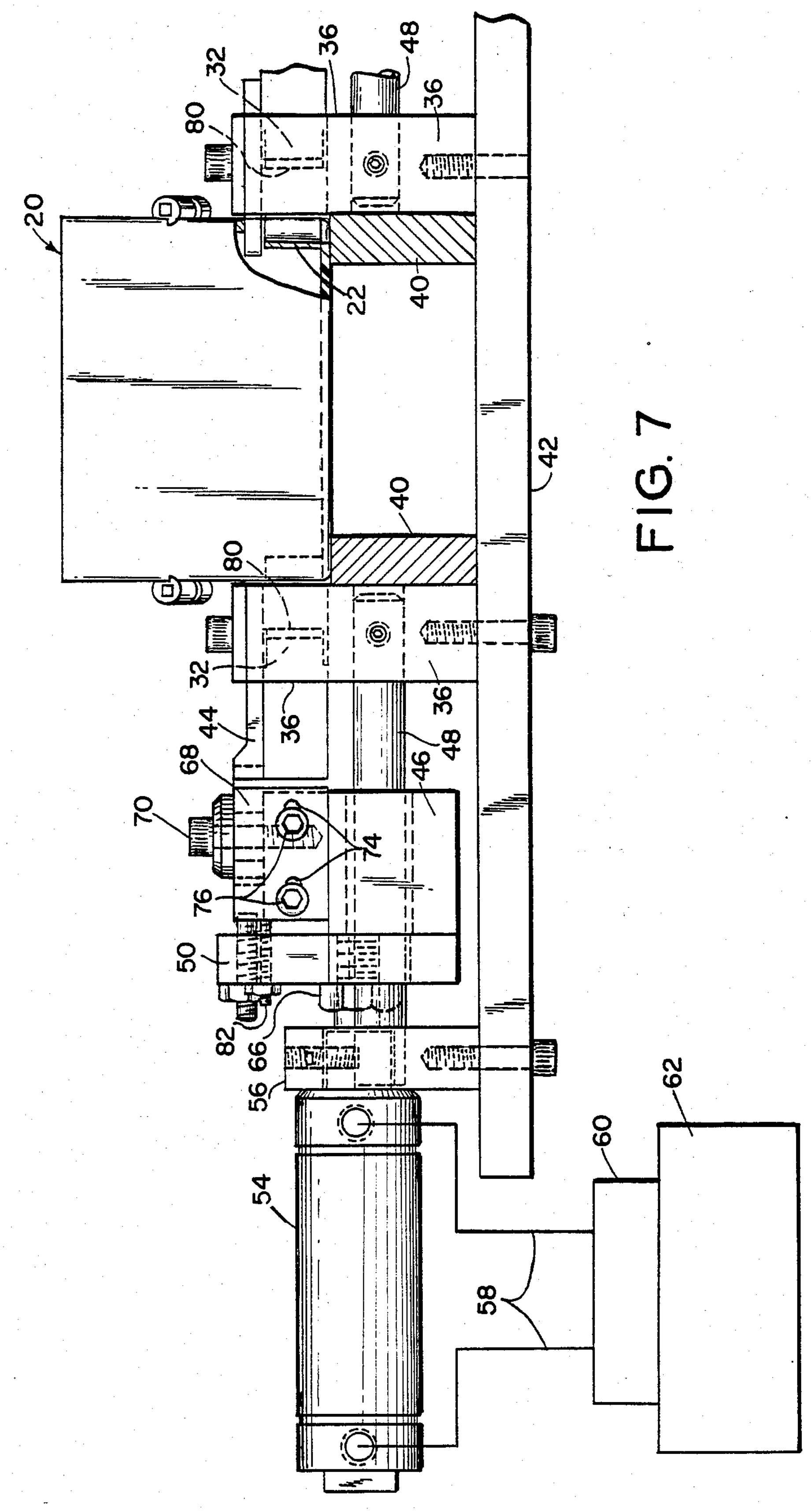
FIG. 7 is a side elevation view of the complete apparatus of FIG. 6.

The rams 32 are formed of plates having heel portions 71 in which slot-shaped apertures 74 are formed, through which screws 76 pass into the shoe 68 for adjustably securing the rams 32 to the slide 46. Upon full extension of the piston 52, cutting edges 80 of the rams 32 advance to the desired position within the corresponding ports 22 of box 20 for penetrating the webs 28 thereof. The cutting edges 80, as shown in FIG. 6, are preferably wedge shaped to form a relatively sharp edge to penetrate webs 28.

In operation, therefore, as the final step in the fabrication of the box 20, the pre-fracture of the webs 28 is accomplished by locating the box 20 between uprights 36 and driving the rams 32 into the ports 22 between the oppositely disposed edges of panels 24. The length of a cutting edge 80 is preset to fit into a port 22 and, when piston shaft 52 is fully extended, to project slightly beyond each web 28 to ensure fracturing.

To this end, uprights 36 are spaced apart a distance equal to the height of the box 20 (i.e., the distance between end-walls) and are spaced from the drive unit 54 of each apparatus 30 by a preset distance such that each ram 32, in its extended position, contacts the webs 28 of each port 22. The spacing between a ram 32 and its corresponding port 22 is accomplished before tightening the mounting screws 76 by adjustment screw 82 (which extends through) block 50 to abut the back of heel portions 71. Advancement of the screw 82 urges the ram 32 forward into its desired position whereupon the screws 76 are tightened to hold the ram 32 in position.

Alignment of the ram cutting edges 80 with their corresponding webs 28 in the ports 22 is established by the height of the blocks 40 and by the locator plate 44. Upon activation of the valve assembly 60, compressed air is applied from source 62 through the lines 58 for advancing the piston shaft 52 which, in turn, simultaneously advances the rams 32 and the locator plate 44. Since plate 44 initially projects beyond ram edges 80, it will contact the box before the rams. The ramp-like teeth 45 will engage the corners of box 20 to "funnel" the box into proper location for the fracturing operation. Thus locator edge 45*a* (the portion between the bases of teeth 45) should be the same length as the width of the box endwalls.

In order to maintain a force by the locator plate 44 against the box 20 yet allow the rams 32 to continue advancing into the ports 22, coil springs 84 (best seen in FIG. 8) are positioned between the back end of the locator plate 44 and rear block 50 of the slide 46 to urge the plate 44 forward from the block 50. The front end of a spring 84 is positioned within a cavity 86 of the plate 44, and the back end of the spring 84 is positioned within a cavity 88 of the block 50. Thus, once ramp-like teeth 45 engage the box to locate it relative to the rams, further advance of the slide blocks 46 increases the locating force on the box (by compressing the springs 84 at opposite ends of the box).

Figure 9:
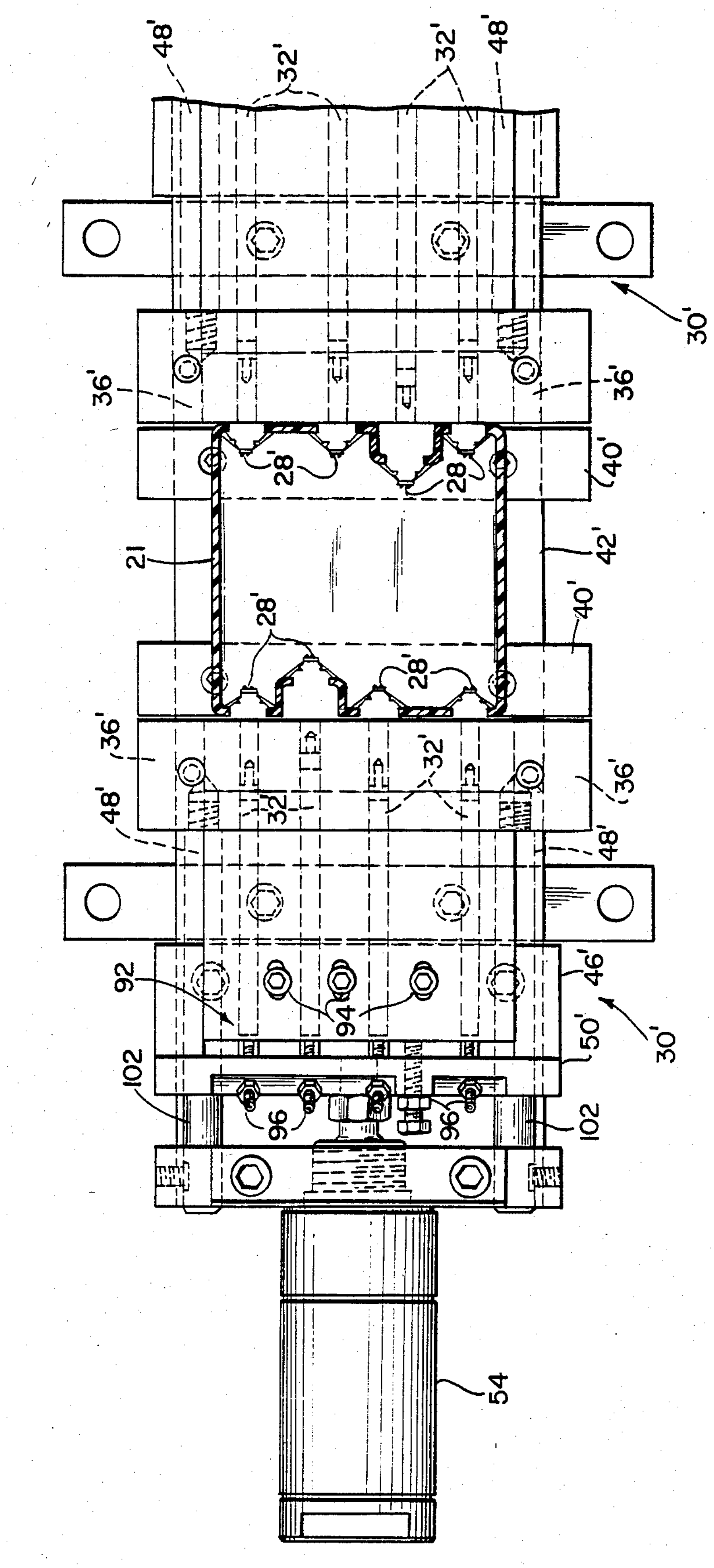
FIGS. 9 and 10 are detailed plan and elevation views, respectively, of an alternative embodiment of apparatus according to the present inventions, showing how the invention can be adapted to pre-fracture webbing of cable entry port means on multi-gang boxes.
Figure 10:
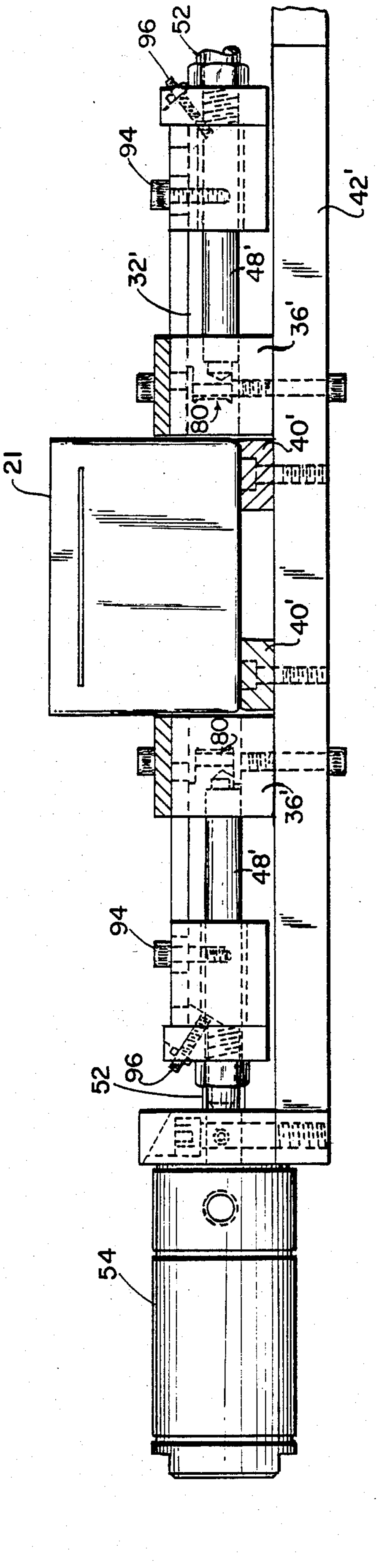
Figure 11:
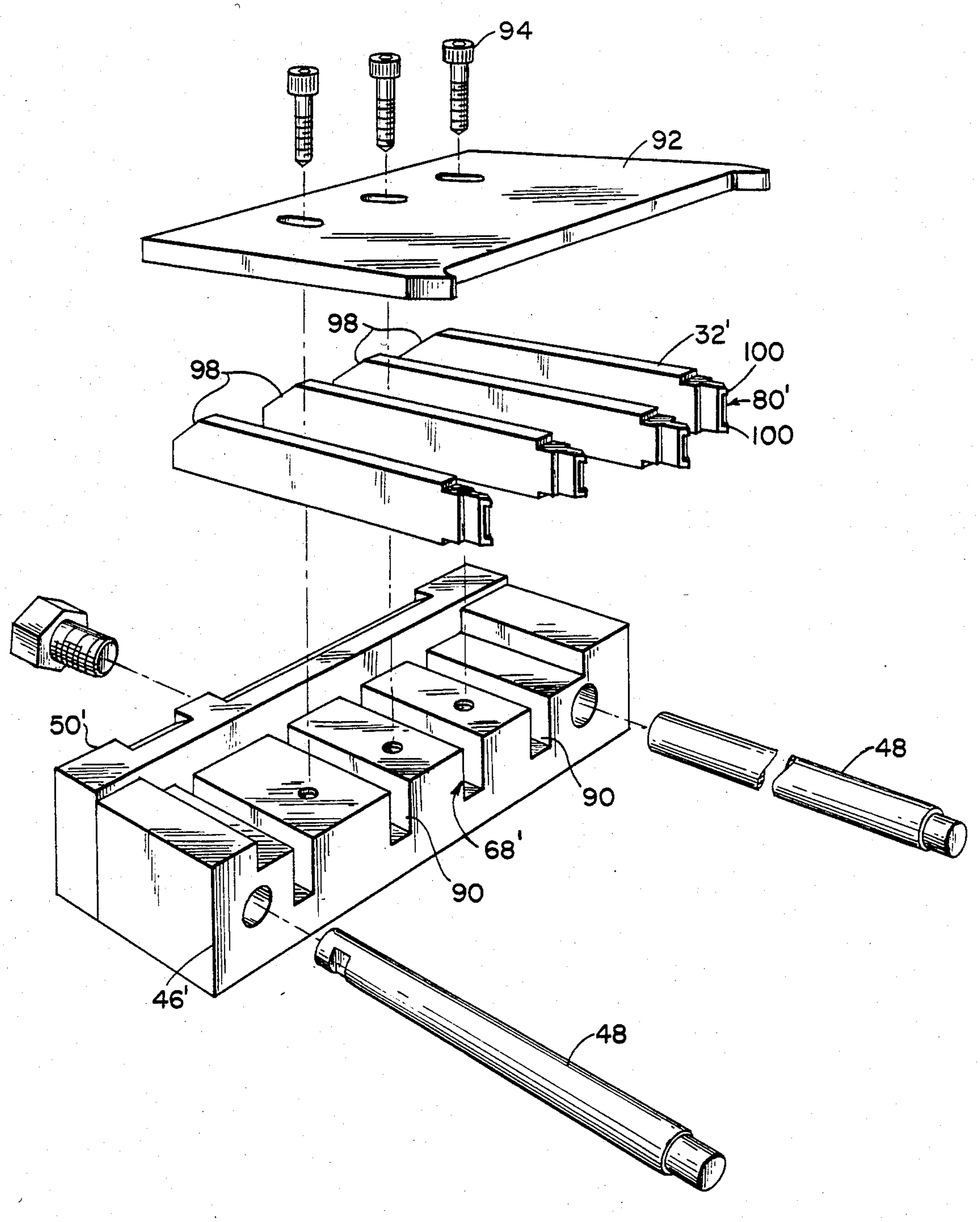
FIG. 11 is an exploded view of a portion of the apparatus of FIG. 9.

Referring now to FIGS. 9–11, there is shown an alternative embodiment of ram apparatus (identified at 30') adapted to pre-fracture the ports of a multi-gang box (indicated at 21 in FIG. 9). The apparatus 30' differs from the previously described apparatus 30 in that the locator plate 44 (and the accompanying structures) has been deleted, and the ram-support shoe 68 has been replaced with a multi-slotted shoe member 68' formed on slide 46'. The shoe 68' contains a set of parallel slots 90 for receiving the heel portions of rams 32'. The rams 32' are held within the slots 90 by a retainer plate 92 secured by screws 94 into the individual sections of the shoe 68'.

The piston 52 of the drive unit 54 is similar to that described above and is similarly secured to a rear block 50' of the slide 46' for moving the slide along the rails 48 in the same manner described above for apparatus 30. Screws 96 are threaded through the rear block 50' to abut the beveled corners 98 on the rams 32' for permitting adjustment of the positions of the rams 32' in the slots 90, thereby to adjust the location of the cutting edges of the rams before screws 94 are fully tightened against the retainer plate 92.

The adjustment screws 96 are conveniently angled relative to the plane of the rails 48 to facilitate the adjustment. Thus, the cutting edges of rams 32' may be located at different positions relative to each other to accommodate ports disposed at different depths in the wall of box 21.

Figure 12:
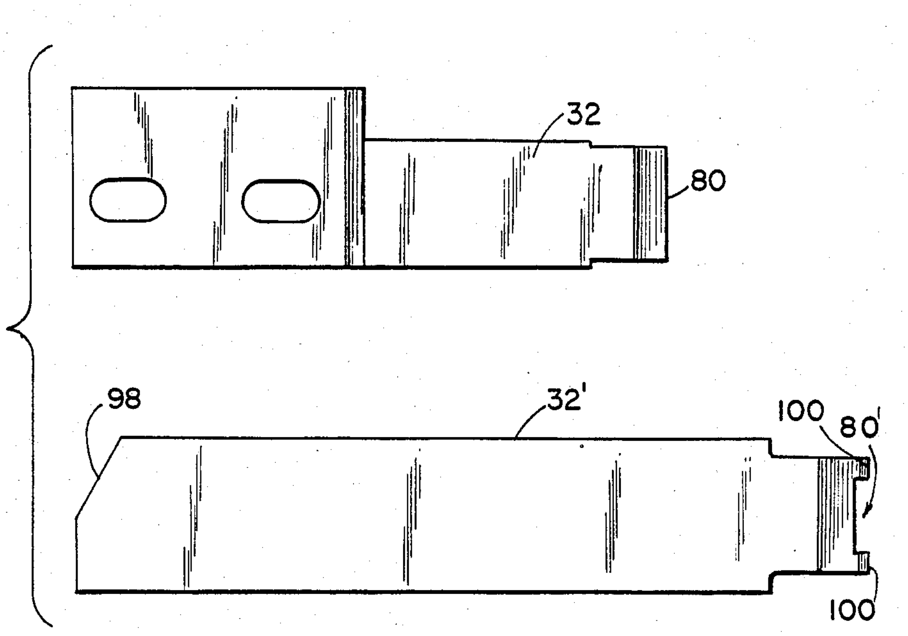
FIG. 12 shows two different ram members according to the invention.

Referring to FIG. 12, there are shown two exemplary cutting edges for rams according to the present invention. The cutting edge 80 of the ram 32 is straight while the ram 32' is provided with a bifurcated cutting edge 80' which is formed by a pair of spaced-apart teeth 100. The choice of cutting edge depends on the form of the web in a port of the outlet box. The web 28 of the box 20 (FIGS. 1-4) is uniform in thickness as are the panels 24 and can satisfactorily be pierced over its entire length by the straight cutting edge 80. The web 28' (FIG. 13) of the box 20' includes a pair of ribs which helps material flow during molding and enhance the cable-grasping function. Since there may be a build-up of material at the front and back ends of the webs the bifurcated cutting edge 80' concentrates the fracturing force at these points, which is sufficient to fracture the entire web.

Figure 13:
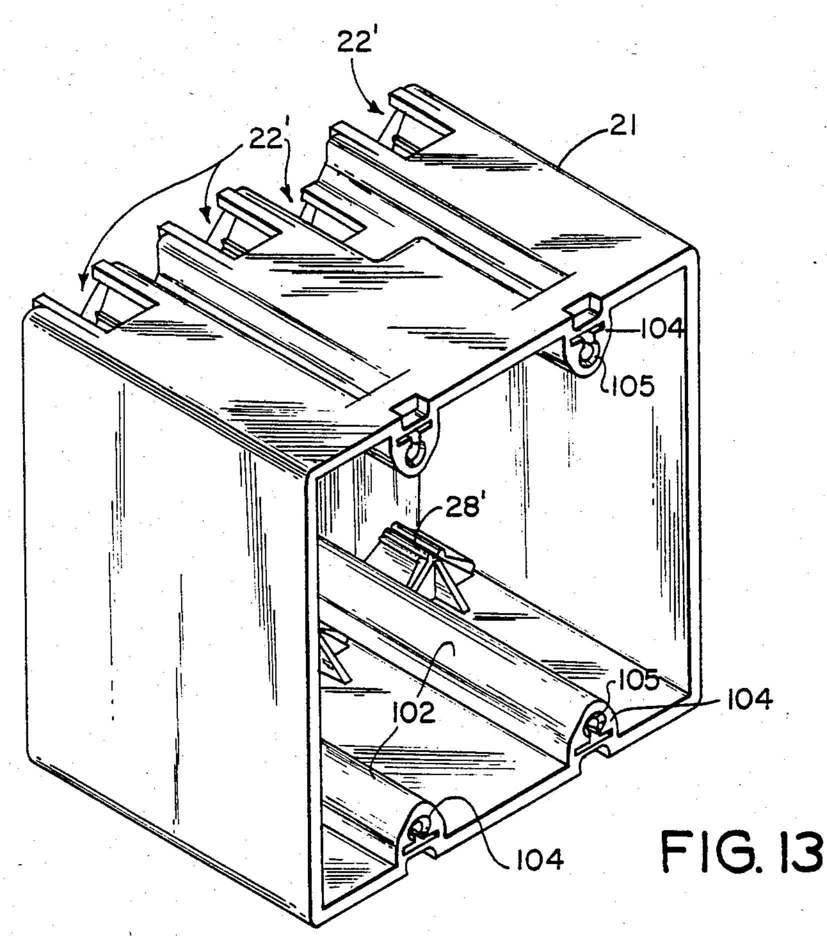
FIG. 13 is an isometric view of a multi-gang (here, a double-gang) electrical outlet box having four ports on each end wall, one port on each wall being located at a greater depth in the box than the other ports.

Referring now to FIG. 13, the outlet box 20' includes four cable entry ports 22' on each of the oppositely disposed end-walls of the box 21. One of the ports is recessed inwardly of the box wall to provide additional space along the side of the box to accommodate the four ports as well as the ports 102 for securing receptacles and/or switches (not shown), as described in U.S. Pat. No. 4,348,547, issued Sept. 7, 1982, assigned to the same assignee as the present application and incorporated by reference.

The four ports are adapted to receive a mounting clip (such as disclosed in U.S. Pat. Nos. 4,188,854; 4,105,862; and 3,955,403) for mounting a receptacle or switch to the box. The apparatus used to insert the mounting clips in slots 104 in the ports can be used as the locator means to position the box for the fracturing step.

Figure 14:
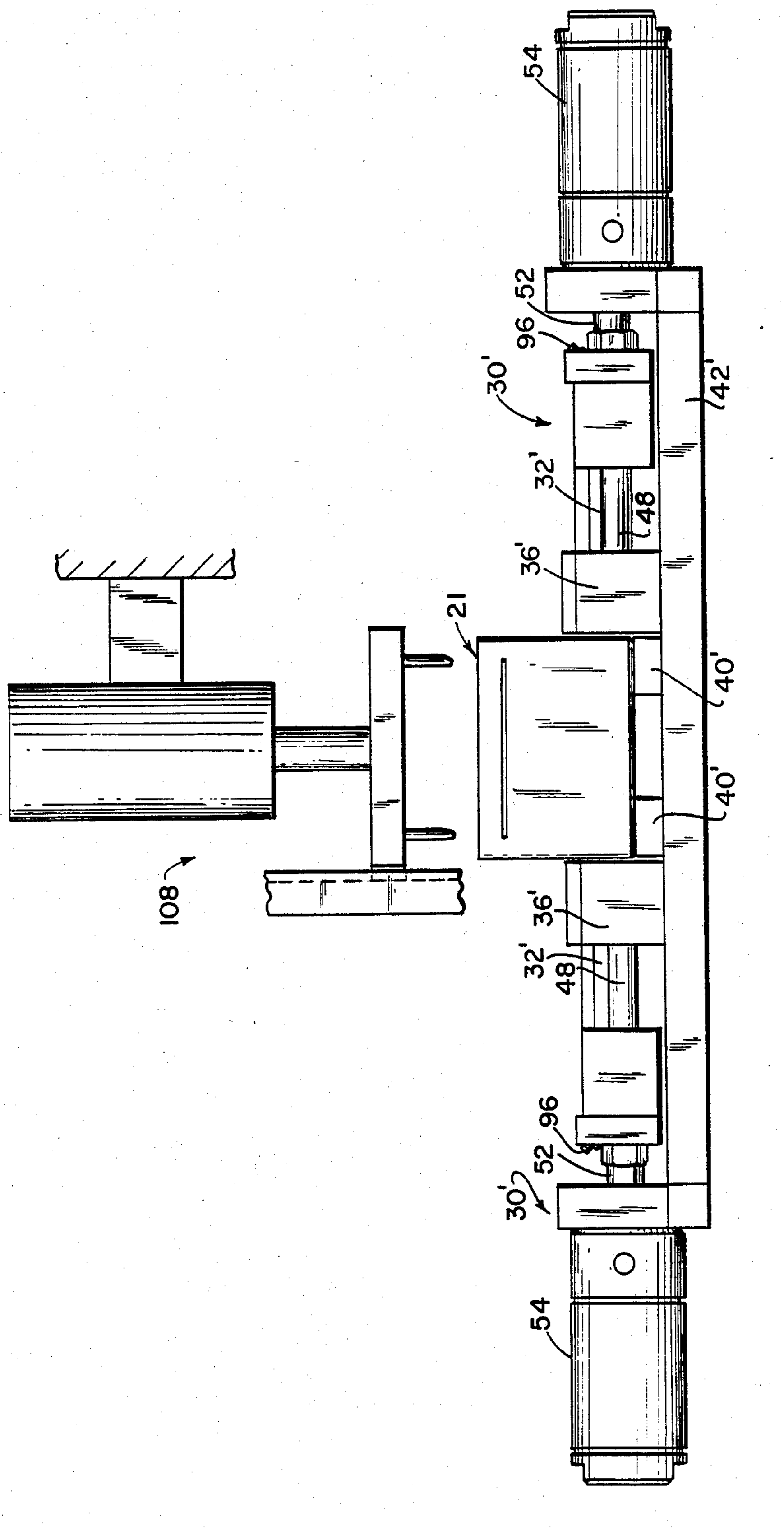
FIG. 14 is an elevation view of the complete apparatus of FIG. 9, showing a box location unit positioned above the box.

Referring now to FIG. 14, there is shown a system 29' comprising two ram apparatuses 30' positioned about the outlet box 21. Clip insertion unit 108 is positioned above box 21 for inserting clips into the slots and thereby retaining the box 21 so that its ports 22' are in alignment with the rams 32' of the apparatus 30'.

Accordingly, as here embodied, the box 21 is supported by uprights 36' and blocks 40' on the base 42'. The clip-insertion/locator unit 108 is shown partly in diagrammatic form. Unit 108 includes means for locating the box in order to insert the clip members into slots 104, such as pins which can fit into apertures 105 which are formed adjacent slots 104 in posts 102. Once properly located, the box can receive the clips which can simply be forced into slots 104 by unit 108. Thereafter, and while the locating pins are still located in apertures 105, rams 32' can be advanced to fracture the webs.

It is to be understood that the above-described embodiments of the invention are illustrative only and that modifications thereof may occur to those skilled in the art. For example, the method and apparatus of the invention can be adapted to pre-fracture the cable entry port closure means of multi-gang boxes larger than double gang boxes. It may, however, be desirable to include lever-like means with the air cylinder mechanism because of the larger force required to penetrate the webs of six or more ports.

In addition, the clip insertion apparatus can be used as the locator of any ram apparatus. Similarly, a locator plate can be fitted to any ram apparatus. Accordingly, this invention is not to be regarded as limited to the embodiments disclosed herein, but is to be limited only as defined by the appended claims.

What is claimed is:

1. Apparatus for pre-fracturing the webs of closure means for cable-entry ports in molded electrical outlet boxes, comprising:
   - a ram-like member having an edge for penetrating the web;
   - means for advancing said ram-like member towards the web; and
   - locating means including ramp means for maintaining the box in desired position to thereby center the web under the ram edge during advance of the ram-like member, said locating means being associated with said advancing means to engage the outlet box directly in conjunction with the advancing of said ram-like member, such that the closure means retain sufficient residual strength to withstand industry impact and other standards for closure of cable-entry ports.

2. Apparatus according to claim 1 further comprising means for adjusting the position of said ram edge for insertion of said edge a predetermined distance into its corresponding cable-entry port during advance of said ram-like member.

3. Apparatus according to claim 1 or 2 wherein said locating means is driven by said advancing means in conjunction with the driving of said ram-like member.

4. Apparatus according to claim 3 wherein said locating means and said ram are mechanically coupled via a slide to said advancing means, said apparatus including means for guiding the travel of said slide towards and away from said box.

5. Apparatus according to claim 4 wherein said ram is rigidly connected to said slide and said locating means is resiliently biased against said slide to permit movement of said ram subsequent to contact of said box by said locating means.

6. Apparatus for pre-fracturing webs of closure means for cable-entry ports of molded electrical outlet boxes, comprising:
   - a ram-like member having an edge for penetrating the web;
   - means for advancing said ram-like member towards the web; and
   - locating means for maintaining the box in desired position during advance of said ram-like member, said locating means comprising a unit for inserting mounting clips in the box.

* * * * *